(12) United States Patent
Phelipot

(10) Patent No.: US 6,680,687 B2
(45) Date of Patent: Jan. 20, 2004

(54) METHOD TO DETERMINE THE AZIMUTH OF A TARGET BY MEANS OF A RADAR, ESPECIALLY OF THE ASR TYPE

(75) Inventor: Michel Phelipot, Villiers S/Harne (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/236,936

(22) Filed: Sep. 9, 2002

(65) Prior Publication Data

US 2003/0052812 A1 Mar. 20, 2003

(30) Foreign Application Priority Data

Sep. 7, 2001 (FR) .............................. 01 11620

(51) Int. Cl.[7] .............................................. G01S 13/93
(52) U.S. Cl. ........................... 342/29; 342/25; 342/147
(58) Field of Search ........................... 342/29, 32, 36, 342/37, 195, 147, 25

(56) References Cited

U.S. PATENT DOCUMENTS 5,694,342 A * 12/1997 Stein .......................... 702/190
5,960,097 A * 9/1999 Pfeiffer et al. ............... 382/103
6,198,426 B1 * 3/2001 Tamatsu et al. ............... 342/70
6,201,496 B1 * 3/2001 Lee .............................. 342/90

OTHER PUBLICATIONS

R. J. Machuzak, et al., "New Centroid Algorithm Based Upon Amplitude–Angle Signature", IEEE Transaction on Aerospace and Electronic Systems, vol. AES–19, No. 4, Jul. 1983, pp. 568–576.

* cited by examiner

Primary Examiner—Thomas H. Tarcza
Assistant Examiner—Isam Alsomiri
(74) Attorney, Agent, or Firm—Oblon, Spivak, McClelland, Maier & Neustadt, PC

(57) ABSTRACT

A method to determine a target azimuth with a radar. The radar sends out a wave of N-pulse bursts. The method includes in one burst: splitting up a N-pulse burst into two half bursts, of a front burst and a rear burst; filtering the front and rear bursts to associate an azimuth value $\theta_1$ and an amplitude value $A_1$ with the front burst, and an azimuth value $\theta_2$ and an amplitude value $A_2$ with the rear burst; and obtaining the target azimuth Az at a value corresponding to a maximum of a Gaussian curve passing through points having components $(\theta_1, A_1)$ and $(\theta_2, A_2)$.

11 Claims, 2 Drawing Sheets

METHOD TO DETERMINE THE AZIMUTH OF A TARGET BY MEANS OF A RADAR, ESPECIALLY OF THE ASR TYPE

BACKGROUND OF THE INVENTION

1. Field of the Invention

The present invention is related to a method to determine target azimuth by the use of an ASR (Airport Surveillance Radar) type radar. It can be applied in particular to surveillance radars used, for example, for air traffic control applications.

A primary radar has the talks not only of indicating the presence of targets of interest within its detection zone, but also of providing data on these targets, especially their position in terms of distance and azimuth. The primary radars used, for example, for air traffic control, are essentially classic 2D radars. For reasons of economy in particular, they do not use single-pulse type techniques to prepare azimuth data. Thus, azimuth data is usually obtained by barycenter type computation methods in which the azimuth values of the different detections that form the radar blip are weighted by their amplitude.

2. Description of the Prior Art

In earlier radars, there used to be a large number of detection information elements pertaining to a target per period of illumination of the target, since these radars did not use Doppler processing. For example, a classic illumination time of 15 ms for a precision approach radar emitting a recurrence signal approximately every 1 ms gave 15 recurrence zones and hence 15 detections.

The Doppler processing radars there were subsequently used carried out a sliding filter operation on the n last recurrences so that a non-negligible quantity of data remained.

Then, the techniques of MTD (mobile target detector) Doppler filtering techniques combined with burst mode operation used to improve the detection of targets in the presence of ground or rain clutter resulted in a drastic reduction of the number of detections on each target. In very many cases, there were only one or two detections on distant targets or targets with low radar equivalent surface. To give an order of magnitude, and referring to the previous example, the detection rate went from 15 pieces of information on position (i.e. the number of valid information elements needed to extract the azimuth position) per burst to two.

The emergence of instantaneous wideband solid-state transmitters that enable working in two frequencies to improve the detection by diversity effect has the additional consequence of further halving the number of detections on each frequency.

At fixed frequencies, with two pieces of detection information, it is still possible to obtain an extraction of azimuth position. With the use of two frequencies, since the number of detections is halved, there is only one detection per target. Thus, the azimuth of the target can only be associated with the azimuth of the detection. It can then be assumed, in an initial approximation, that the error is distributed on more or less one half-length of the antenna lobe. The position error thus becomes great.

SUMMARY OF THE INVENTION

One aim of the invention especially is to improve the azimuth precision of a radar, for example of the ASR type.

To this end, an object of the invention is a method to determine the azimuth of a target by means of a radar that sends out a wave of detections by N-pulse bursts. The method comprises at least the following steps in one burst:

a step in which the burst is split up into two half bursts, one front burst and one rear burst;

a step for filtering the half burst to associate an azimuth value $\theta_1$ and an amplitude value $A_1$ with the front burst, and an azimuth value $\theta_2$ and an amplitude value $A_2$ with the rear burst;

a step to obtain the azimuth Az of the target at a value corresponding to the maximum of a Gaussian curve passing through the points having components $(\theta_1, A_1)$, $(\theta_2, A_2)$.

Preferably, the front and rear half bursts have the same number of pulses, N/2.

The main advantages of the invention are that it substantially improves performance in discriminating between two targets located at the same distance and separated by a small distance at azimuth, does not complicate the radar processing and is simple to implement.

BRIEF DESCRIPTION OF THE DRAWINGS

Other features and advantages of the invention shall appear from the following description, made with reference to the appended drawings of which.

MORE DETAILED DESCRIPTION

Figure 1:
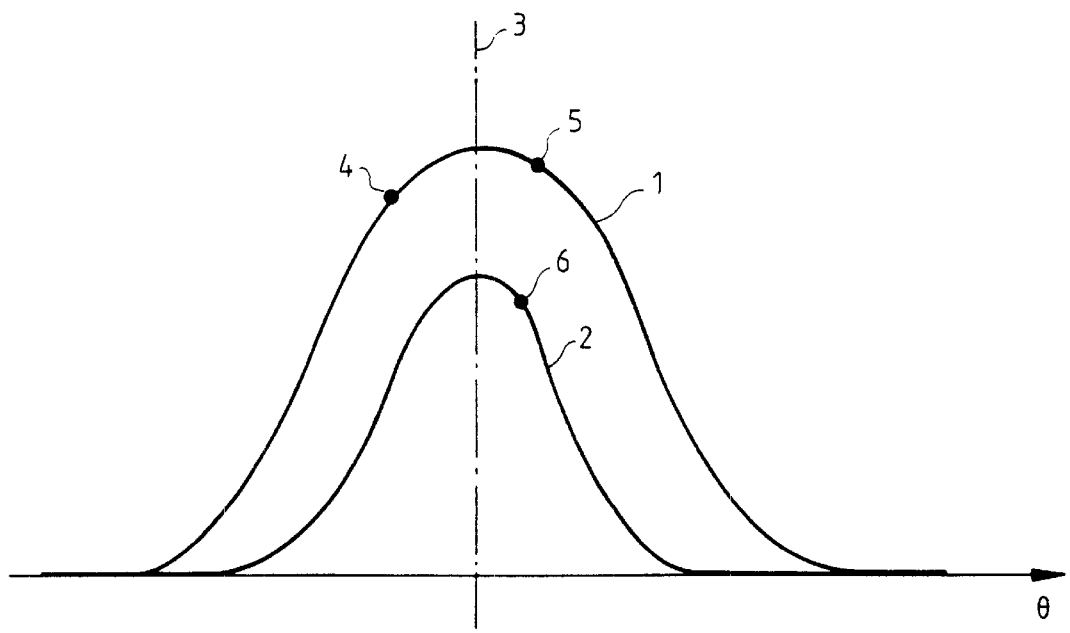
FIG. 1 shows two patterns of a same antenna corresponding to two different transmission frequencies $f_1$, $f_2$.

FIG. 1 illustrates two antenna patterns of a radar as a function of the azimuth angle $\theta$. These two patterns therefore represent the gain of the antenna and, consequently, the signal received as a function of this angle. A first pattern 1, which has a Gaussian shape, represents the signal received at a frequency $f_1$. A second pattern 2, which also has a Gaussian shape, represents the signal received at a frequency $f_2$. These patterns are substantially symmetrical to the reference boresight axis 3 of the antenna. As indicated earlier, this is the case of a radar working on two frequencies with the goal especially of increasing the probability of detection. The first antenna pattern 1 is used for example to make two detections illustrated by two blips 4, 5 while the second antenna pattern can be used to make only one detection illustrated by a blip 6. These blips indicate the position of the target echoes in the antenna patterns. The presence of these echoes after each transmission burst of the radar is used to deduce especially the azimuth position of the target symbolized by the position of a blip center.

Classically, the blip center in azimuth is computed in two steps. For this purpose, a cluster of echo presences or echoes is considered. It is assumed that this cluster results from a single target pertaining to two types of monitoring, depending on whether the target is in the near domain or the distant domain. The term << cluster >> designates a grouping of echo presences associated with one another according to criteria of connexity in distance and in azimuth.

In a first step, for each frequency, an azimuth of the sub-blip corresponding to this frequency is computed. A sub-blip herein designates a grouping of all the echo presences of a cluster belonging to a given frequency. A cluster may therefore be formed by two sub-blips or a single sub-blip. If the echo presences of a sub-blip belong to only one radar interrogation or burst, which is the case with a sub-blip called a single burst, the azimuth of this sub-blip is then the azimuth of the interrogation, namely, the azimuth of the antenna at the middle instant of the burst. If the sub-blip is formed by echo presences belonging to at least two adjacent interrogations at the same frequency, which is the case with a multiple burst sub-blip, its azimuth is then computed from the echo presence of the cluster that has the maximum rough amplitude and that of the same range gate and of the adjacent burst in assuming that the antenna lobe is Gaussian.

In a second step, the azimuth of the center blip is then a mean of the azimuth of the sub-blips if they have been computed by the same method. They are then both single-burst and multiple-burst sub-blips. Should only one of them be a multiple-burst sub-blip, it is then its azimuth that is kept because it is then considered to be of better quality.

FIG. 1 shows that there can only be one detection or echo presence 6 for a target. The blip is therefore formed by only one single-burst sub-blip. The chosen azimuth is then quantified at the pitch of the bursts, which is in the range of two degrees for example, corresponding to the azimuth width of the antenna lobe. Thus, the error may theoretically reach ±1° with a standard deviation of 0.57°, namely $2°/\sqrt{12}$. In reality, the errors may be slightly smaller because, when the target is centered between two bursts, either its signal-to-noise ratio is too small to be detected owing to misalignment, or it responds on two bursts. In this case, the precision again becomes correct. It is nonetheless true that, for signal-to-noise ratios for example of less than 25 dB before coherent integration, the standard deviation of the azimuth error is appreciably greater than a target value, for example of about 0.1°.

Figure 2:
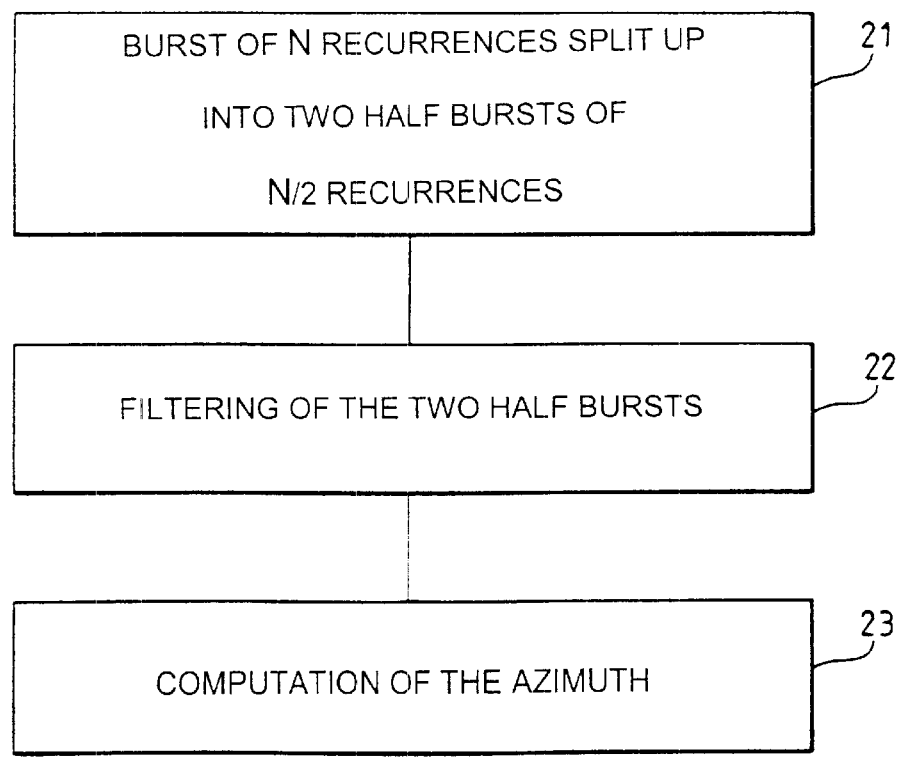
FIG. 2 shows possible steps of the method according to the invention.

FIG. 2 illustrates the possible steps of the method according to the invention applied to each transmission burst, the radar sending out one detection wave per pulse burst. It has been seen here above that it is the MTD Doppler used to improve the detection in the clutter, where the signal-to-noise ratio is diminished, that reduces the number of information elements that can be used. We have also seen that a filtering of this kind, necessitating an increase in the number of recurrences per transmission burst, had the effect of reducing the number of detection information elements, this number being further reduced by the use of two frequencies, especially as illustrated in FIG. 1.

The method according to the invention uses especially the fact that, before the Doppler filtering, the different recurrences that form a burst at constant transmission frequency are amplitude-modulated by the antenna lobe. The invention shows that it is then possible to extract the azimuth of the target from it by assuming a Gaussian antenna lobe in the same way as in the computation of a multiple-burst sub-blip. To preserve a capacity for separating the target from the clutter, the N-pulse burst is fictitiously subdivided into two half-bursts of N/2 pulses. These two half bursts are then filtered by an N/2 order bank of filters.

The method according to the invention then comprises a step 21 where a burst of N recurrences is split up into two half bursts respectively formed by the first N/2 recurrences, namely the front half burst, and by the N/2 last recurrences, namely the rear half-burst. This fictitious sectioning is done, for example, at reception before filtering. Preferably, the burst is separated into two groups of N/2 pulses. However, it may happen that the front half-burst does not have the same number of pulses as the rear half burst. It is furthermore possible to split up the burst into more than two bursts.

In a subsequent step 22, the two half bursts are filtered. At output of the filter, the azimuth values $\theta_1$ and $\theta_2$ of the antenna respectively at the center of the front half burst and at the center of the rear half burst are obtained, as also the rough amplitudes $A_1$ and $A_2$ of the received signal corresponding respectively to the front half burst and a rear half burst. If the detection is done by the full burst filtering means, it is possible to have twice the amount of information available for computing the azimuth by using the result of the filtering of the two half-bursts. To minimize the filtering load, it is possible to filter the half bursts only in the cells where there has been detection: the filter used is itself addressed by the rank of the filter in which the detection has been observed. The method according to the invention therefore does not complicate the radar processing. It is particularly simple to implement.

Figure 3:
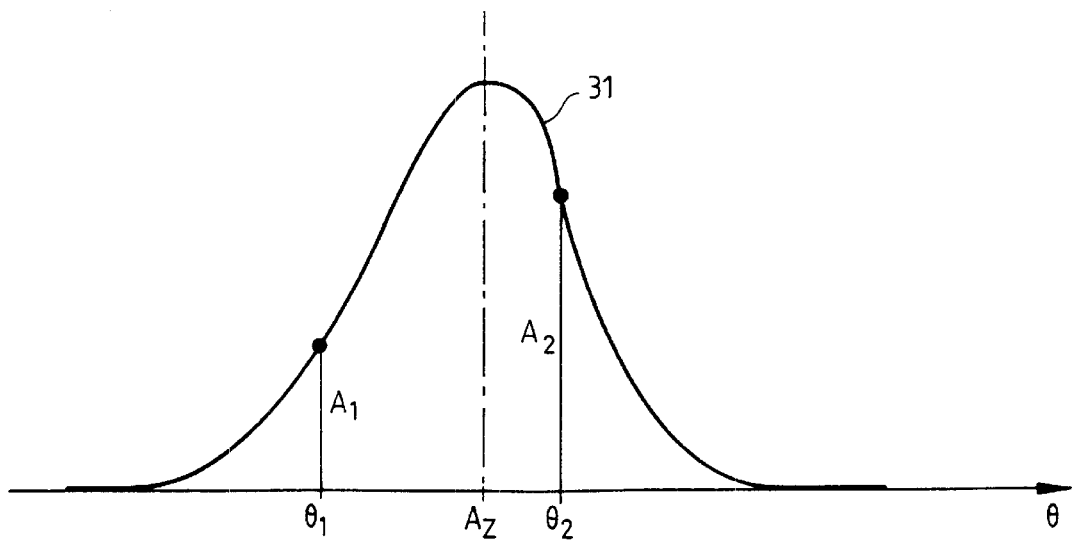
FIG. 3 shows an antenna pattern obtained from two predetermined azimuth points $\theta_1$, $\theta_2$.

In a subsequent step 33, the azimuth of the target is computed from the results of the filtering of the two half-bursts. This step is based especially on the observation that the antenna lobe generally has a substantially Gaussian shape in azimuth, at least in the part useful for the detection of the targets with low signal-to-noise ratio, namely around the maximum of the antenna pattern. The knowledge of two points of the pattern, having components ($\theta_1$, $A_1$) and ($\theta_2$, $A_2$), is then enough to determine the position of the maximum. The angle corresponding to this maximum is the azimuth sought, as illustrated by FIG. 3 which shows a Gaussian curve 31 passing through these two points. Thus if, for the azimuths $\theta_1$ and $\theta_2$, the amplitudes measured on a target are $A_1$ and $A_2$, the azimuth Az of the target is given by the following relationship:

$$Az = \left(\frac{\theta_1 + \theta_2}{2}\right) + \frac{\theta_{3dB}^2}{2a(\theta_1 - \theta_2)} \text{Log} \frac{A_1}{A_2} \qquad (1)$$

where $\theta_{3db}$ is the width of the antenna lobe of the radar in azimuth expressed in −3 dB and
a is a constant equal to 8Log2, giving 5.54518.

This relationship (1) is used for the association, with all the detections, of a target azimuth Az, one detection corresponding to the determination of the values $\theta_1$, $\theta_2$, $A_1$, $A_2$.

In a subsequent step, the azimuth used, for example, instead of the azimuth of the detection as a criterion of association of the azimuth detections for the formation of the blips is the azimuth AZ or in other words the azimuth of the burst which risks being affected by an error as seen here above. This has the advantage, especially, of substantially improving the performance in terms of discriminating between two targets located at the same distance and with a small separation in azimuth.

For a radar working with two transmission frequencies $f_1$, $f_2$, the response of a target is formed, in principle, by two sub-blips SP1 and SP2, one for each frequency. The azimuth of a sub-blip is determined, for example, in accordance with the above-mentioned steps 21, 22, 23, especially according to the relationship (1).

However, when a sub-blip is formed by at least two detections, it is no longer necessary to fictitiously subdivide the burst into two half bursts. The relationship (1) can then be applied to the computation of an azimuth value for this sub-blip, by using the burst amplitudes and no longer the half burst amplitudes, that is the maximum value of the main detection and the sub-maximum value of the adjacent detection. It is of course always possible to choose, as the azimuth of the sub-blip, the target azimuth computed for this detection.

Depending on whether a sub-blip is formed by a single detection or not, namely depending on whether a burst contains one of more pieces of detection information at reception, the azimuth of this sub-blip is therefore:

the target azimuth obtained by using the two half bursts of the detection in accordance with the steps 21, 22, 23 of the method in the case of single detection;

the target azimuth obtained by using the two bursts, or detections, of this sub-blip having maximum amplitude and adjacent sub-maximum amplitude, in the case of multiple detection.

The quality of the target azimuth, obtained from two sub-blips, is always better than that of a single-detection sub-blip because the Doppler filtering using N pulses has better performance. Since the distance between the two measurements is greater, the influence of the noises is reduced. It is therefore given greater importance. This means that the azimuth of the blip is obtained as a function of the azimuths of the two sub-blips S1, SP2 as defined here below, the two sub-blips SP1, SP2 being for example those obtained at the two different frequencies $f_1$, $f_2$:

the presence of the single-detection sub-blip SP1 alone: the azimuth of the blip is the azimuth of the sub-blip SP1;

the presence of the single-detection sub-blip SP2 alone: the azimuth of the blip is the azimuth of the sub-blip SP2;

the presence of the sub-blip SP1 having a single-detection composition and of the sub-blip SP2 having a single-detection composition: the azimuth of the blip is the mean of the azimuths of the sub-blips SP1, SP2, i.e. if $Az_1$ and $Az_2$ are these azimuths, the azimuth of the blip is $(Az_1+Az_2)/2$;

the presence of the sub-blip SP1 having a multiple-detection composition and of the sub-blip SP2 having a single-detection composition: the azimuth of the blip is the azimuth of the sub-blip SP1;

the presence of the sub-blip SP1 having a single-detection composition and of the sub-blip SP2 having a multiple-detection composition: the azimuth of the blip is the azimuth of the sub-blip SP2;

the presence of the sub-blip SP1 and of the sub-blip SP2, both having a multiple-detection composition: the azimuth of the blip is the mean weighted by the amplitudes of the azimuths of the sub-blips SP1 and SP2.

What is claimed is:

1. A method to determine an azimuth of a target with a radar that sends out a wave of N-pulse bursts, wherein the method comprises in one burst:

splitting up into two half bursts an N-pulse burst of said N-pulse bursts, of a front burst and a rear burst;

filtering the front and rear bursts to associate an azimuth value $\theta_1$ and an amplitude value $A_1$ with the front burst, and an azimuth value $\theta_2$ and an amplitude value $A_2$ with the rear burst; and obtaining the azimuth Az of the target at a value corresponding to a maximum of a Gaussian curve passing through points having components ($\theta_1$, $A_1$) and ($\theta_2$, $A_2$).

2. A method according to claim 1, wherein the front and rear bursts each comprises N/2 impulsions.

3. A method according to claim 2, wherein the azimuth Az is given by the following relationship:

$$Az = \left(\frac{\theta_1 + \theta_2}{2}\right) + \frac{\theta_{3dB}^2}{2a(\theta_1 - \theta_2)} \text{Log} \frac{A_1}{A_2}$$

"$\theta_{3dB}$" being the width of the antenna lobe of the radar in azimuth, expressed at −3 dB; and "a" being a constant.

4. A method according to claim 2, wherein the burst contains only one piece of information.

5. A method according to claim 2, wherein the radar is of an ASR type.

6. A method according to claim 1, wherein the azimuth Az is given by the following relationship:

$$Az = \left(\frac{\theta_1 + \theta_2}{2}\right) + \frac{\theta_{3dB}^2}{2a(\theta_1 - \theta_2)} \text{Log} \frac{A_1}{A_2} \qquad (1)$$

"$\theta_{3dB}$" being the width of the antenna lobe of the radar in azimuth, expressed at −3 dB; and "a" being a constant.

7. A method according to claim 6, wherein the burst contains only one piece of information.

8. A method according to claim 6, wherein the radar is of an ASR type.

9. A method according to claim 1, wherein the burst contains only one piece of information.

10. A method according to claim 9, wherein the radar is of an ASR type.

11. A method according to claim 1, wherein the radar is of an ASR type.

\* \* \* \* \*